Patented May 15, 1934

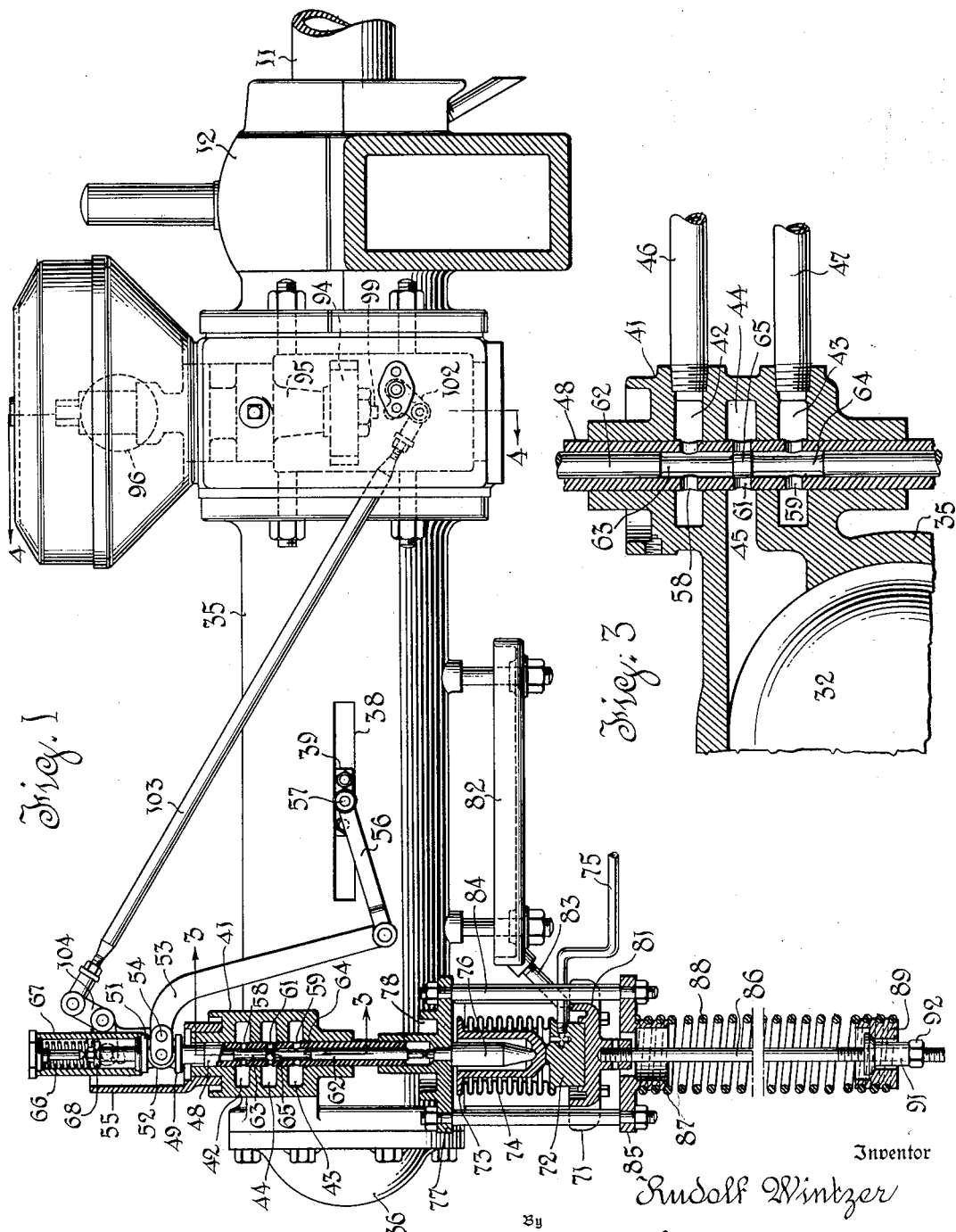

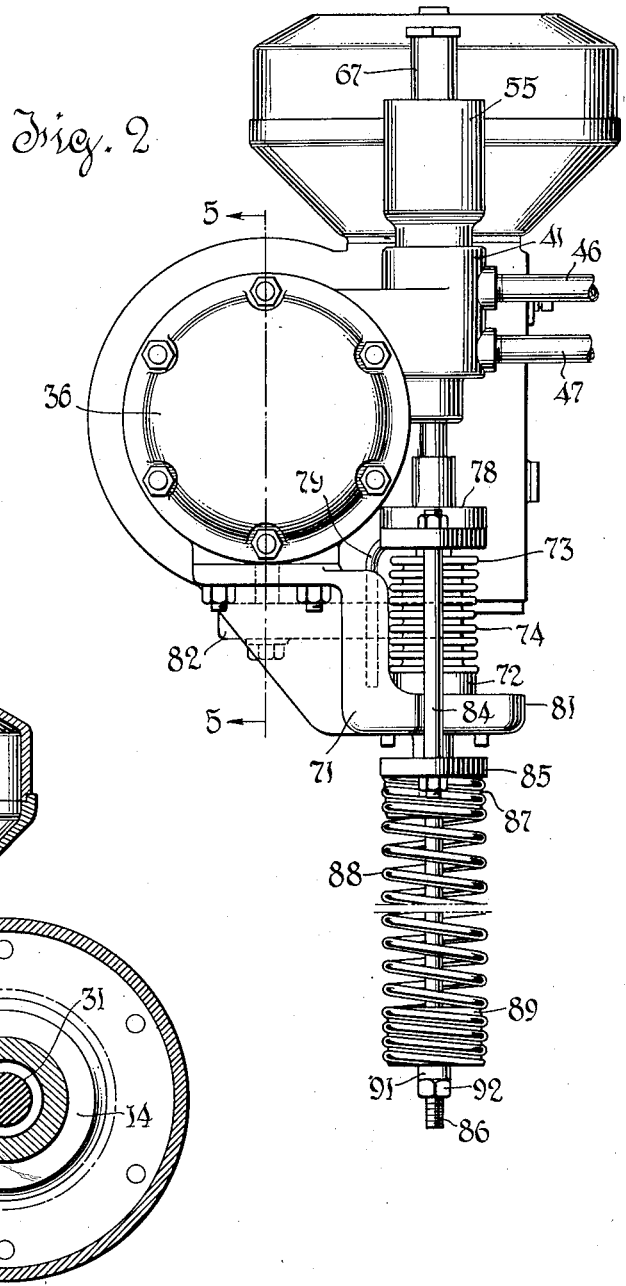

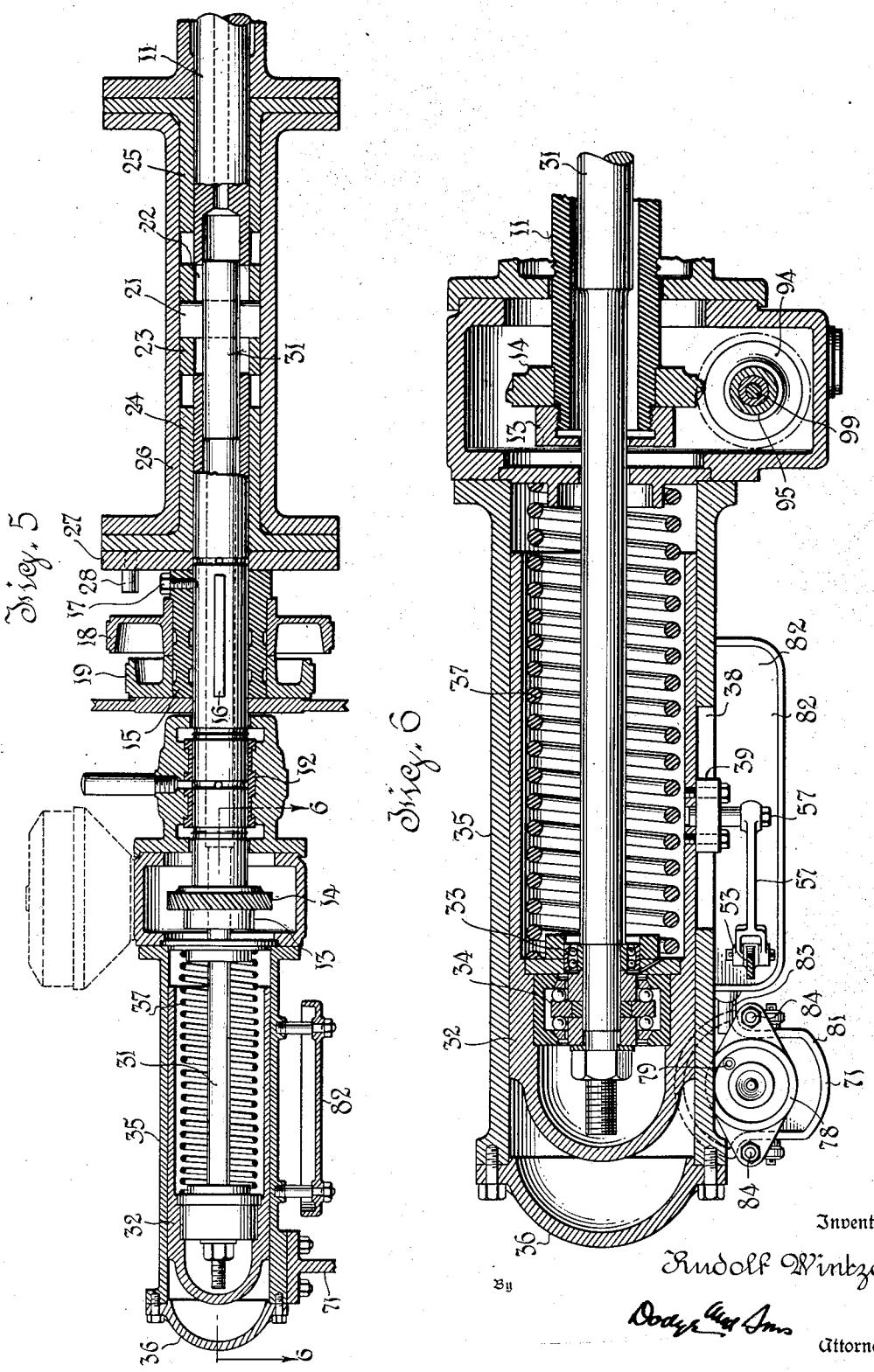

1,958,503

UNITED STATES PATENT OFFICE 1,958,503

GOVERNOR FOR ENGINE DRIVEN COMPRESSORS

Rudolf Wintzer, Milwaukee, Wis., assignor to Nordberg Manufacturing Company, Milwaukee, Wis., a corporation of Wisconsin Application June 20, 1931, Serial No. 545,826

3 Claims. (Cl. 230—5)

This invention relates to governing mechanism for direct connected steam pumps or compressors.

In such units comprising a reciprocating engine having a variable cut off steam-distributing valve gear, and a direct connected compressor delivering to a receiver, it is desirable to regulate the performance of the engine by regulating its cut off in response to variations in receiver pressure. The effect is to cause the engine to vary in speed according to the demand for compressed fluid, and to prevent the engine from running away in the event of rupture of the receiver or piping, or for any other cause, an over speed governor is applied to limit the engine speed to a safe maximum.

The present invention meets the above requirements and offers a peculiarly satisfactory and simple arrangement. The distributing valve gear of the steam engine, which may be of any preferred type, is controlled by a single acting hydraulic servo-motor with opposing spring. The servo-motor is controlled by a follow-up valve mechanism made up of a piston valve and a shiftable ported seat therefor, one of which moves as the piston of the servo-motor moves and the other of which is subject to selective actuation by a pressure responsive device and a speed responsive device. These two devices act in the same sense and enter into unidirectional thrust relation with the controlled element of the follow-up valve, so that either may take control to limit the engine speed.

In the accompanying drawing, the preferred embodiment of the invention is illustrated as applied to a steam engine having a lay shaft and having valve actuating eccentrics which are angularly shiftable on the lay shaft to control the steam distribution. Engines of this general type are well known. The invention is applicable to engines generally and particularly to any engine which is controlled through its distributing valve gear.

In the drawing,—

Fig. 1 is a view, partly in side elevation and partly in section, showing the governing mechanism applied to the end of an eccentric-carrying lay shaft;

Fig. 2 is an end elevation;

Fig. 3 is a fragmentary section on the line 3—3 of Fig. 1;

Fig. 4 is a section on the line 4—4 of Fig. 1;

Fig. 5 is a section on the line 5—5 of Fig. 2; and

Fig. 6 is a section on the line 6—6 of Fig. 5.

Referring first to Figures 5 and 6, the valve gear actuating lay shaft of a variable cut-off steam engine is shown at 11 and is assumed to be driven from the engine crank shaft at crank-shaft speed. One of the lay shaft bearings appears at 12. The left hand end of shaft 11 (as viewed in Fig. 5) is hollow and terminates in an annular cap 13 which is screwed on, and which serves to retain the skew gear 14 forming part of the governor drive, and fixed on shaft 11.

Fixed on shaft 11 adjacent bearing 12 is an eccentric journal sleeve 15 which turns with shaft 11. Connection is made by key 16 and set screw 17. Mounted on the sleeve 15 are valve actuating eccentrics 18 for the inlet valve and 19 for the exhaust valve. In the example illustrated 18 is swiveled so as to be adjustable to vary the cut-off. The eccentric 19 is fixed.

To the right of sleeve 15, and swiveled on shaft 11, is a cam mechanism for shifting the inlet valve actuating eccentric 18. A key 21 extends through and is shiftable in a longitudinal slot 22 in shaft 11 and engages a spiral cam-follower sleeve 23, to move this sleeve longitudinally on shaft 11 while restraining it against angular movement relatively thereto. The follower 23 is confined between two cylindrical spiral cams 24 and 25 which are rigidly connected together by the flanged sleeve 26. The members 24, 25 and 26 and a disc 27 rigidly connected thereto, thus turn as a unit on shaft 11 if the key 21 is shifted longitudinally of shaft 11.

The disc 27 carries a crank pin 28 which is connected, by mechanism not shown in the drawing, and for which no novelty is here claimed, with the eccentric 18 so as to shift it angularly in proper relation and according to known practice in the valve gear art, to vary the cut-off.

The mechanism so far outlined is described merely as an example of a distributing valve gear adjustable to control an engine. Many others are known, such as drop cut-off gears, link gears, shifting cam gears and the like, all of which have various forms, and various characteristics of operation, but have in common the fundamental idea of control of the engine by control of steam distribution.

The present invention relates to mechanism for controlling the position of the adjustable element of such a valve gear, which element, in the example illustrated, is the key 21.

The key 21 is fixed in the end of a shaft 31 which in turn is guided in cap 13 and extends beyond the end of shaft 11. The shafts 11 and 31 necessarily turn together, and as shaft 31 is piston actuated in its longitudinal movements it is so connected with actuating piston 32 that the shaft may turn relatively to the piston. The piston 32 is of the trunk or sleeve type, as shown, and shaft 31 is connected thereto by an annular ball bearing 33 and a ball thrust bearing 34. The piston is single acting and works in a hydraulic cylinder 35 having a head 36. Piston 32 is constantly urged to the left by compression spring 37.

The cylinder 35 is slotted at 38 to permit the movements of bracket 39 which is mounted on piston 32 and serves as a driving connection for a portion of the follow-up valve mechanism.

Mounted on the side of the cylinder 35 near the head end thereof is a valve chest 41 having an inlet chamber 42, an exhaust chamber 43 and an intermediate cylinder chamber 44 connected by passage 45 with the head end of cylinder 35.

A pipe 46 brings liquid under pressure to chamber 42 from any suitable source, conveniently a force feed lubricating oil pump (not shown). The pipe 47 leads from chamber 43 to any suitable discharge, for example the sump from which the lubricating pump draws its supply.

A cylindrical guideway or passage extends through the chest 41 and receives a tubular shifting valve seat 48 which at its upper end has two spaced flanges 49 and 51, between which is confined a roller 52 on one arm of the lever 53. The lever 53 is fulcrumed at 54 on bracket 55, which is supported by chest 41, and its other arm is connected by link 56 with a journal pin 57 on bracket 39. Thus the valve seat 48 shifts as piston 32 moves and assumes positions corresponding to the various positions of the piston.

The tubular valve seat 48 has three sets of ports 58, 59 and 61, which respectively communicate with the chambers 42, 43 and 44 in all positions of the piston 32.

Slidable in the tubular valve seat 48 is a piston valve element 62 having two reduced portions 63 and 64. Between and defined by these is a valve head portion 65 which in its neutral position, relatively to seat 48, just laps ports 61. Consequently the slightest displacement of valve element 62 in one or the other direction from neutral position, will connect port 61 with port 58 or 59 (depending on the direction of such relative displacement).

The valve element 62 is urged downward, relatively to seat 48 by a coil compression spring 66 housed in the cup 67. This is threaded onto the upper end of seat 48 above flange 51. The spring 66 is a light one and reacts against a washer 68 retained by a nut on the upper end of valve member 62.

The valve member 62 is actuated normally by a pressure motor subject to the pressure in the receiver to which the compressor delivers. This motor is supported on a bracket 71 bolted to the lower side of the cylinder 35. The motor comprises a base 72 supported by the bracket, a cup-shaped movable head 73 and a metallic bellows 74 connecting the base and head. A pipe 75 connects through the base 72 with the interior of the bellows motor thus formed and is connected with the receiver (not shown).

A thrust member 76 rests in the cup-like depression in head 73 and carries at its upper end a yoke 77 which has a guideway to receive the lower end of tubular valve seat 48. In this way the valve is enclosed and any oil leaking along the valve and tubular seat is intercepted. It is drained from a sump defined by flange 78, through pipe 79 (see Fig. 2) to the space within flange 81 on bracket 71. From there it is drained away by means not shown. Any leakage through slot 38 is caught by pan 82 and drained through pipe 83 to the space within flange 81.

The yoke 77 is connected by rods 84 with a second yoke 85 below bracket 71. The yoke 85 is apertured to permit the passage of a rod 86, fixed in bracket 71. Surrounding the aperture is a flange 87 formed with thread grooves to receive the upper end of a coil tension spring 88. Screwed into the lower end of the spring is a similarly thread-groove member 89 which is engaged by a flange on nut 91 threaded on the end of rod 86. The nut 91 is locked in adjusted position by jam nut 92.

The "scale" of spring 88, i. e. the relation of stress increment to distortion is adjusted by screwing member 89 more or less into the spring, and thus varying the effective length of the spring. The stress on the spring is then determined by adjusting nut 91.

The mechanism so far described will control the engine in response to receiver pressure. To limit engine speed to a safe maximum an overspeed governor is provided.

The skew gear 14 drives a smaller skew gear 94 on hollow shaft 95. (See Fig. 4). Shaft 95 carries at its upper end ordinary fly-balls 96, pivoted at 97. As the fly-balls swing out with increase of speed their arms depress cap 98 on a rod 99 vertically slidable in hollow shaft 95 and normally held upward by light spring 101.

The lower end of rod 99 is in unidirectional thrust relation with one arm of bell crank 102 whose other arm is connected by link 103 with one arm of bell crank 104 whose other arm underlies washer 68 on valve member 62.

In operation the pressure control is normally alone effective. Increase of pressure in the receiver causes yoke 77 to rise and force valve 62 upward. This connects ports 59 and 61 allowing pressure fluid to exhaust from the cylinder, so that spring 37 moves the piston 32 to the left until the resulting upward movement of valve seat 48 laps the valve ports. Motion of piston 32 to the left actuates the spiral cam mechanism to shift the eccentrics and shorten the cut off, thus slowing the engine. Reduction of pressure in the receiver causes valve 62 to move downward admitting pressure fluid against piston 32. This moves to the right, lengthening the engine cut off until downward movement of seat 48 laps the ports.

The speed responsive governor takes control only under over-speed conditions, when it functions to lift valve 62 and shorten the engine cut off.

The device above described is peculiarly suited to actuate shifting eccentrics on a lay shaft, but, as explained, is generally applicable to govern variable cut off engines driving compressors. The feature of using a shifting valve in conjunction with a shifting seat, to provide a follow-up valve, is peculiarly advantageous;—particularly so where there is to be dual selective control by pressure and speed.

Modifications to meet particular conditions are contemplated.

What is claimed is,—

1. A control device for engine-driven pumps and compressors, comprising, in combination, a fluid-pressure operated servo-motor adapted to control the engine; an admission and exhaust valve mechanism for the servo-motor comprising two movable valve elements, one of which serves as a seat for the other; driving connections between one of said valve elements and the moving member of the servo-motor; yielding means urging the other of said valve elements in a direction to cause the servo-motor to increase engine speed; and two devices capable of entering into thrust relation with said other valve element in opposition to said yielding means, one of said devices moving in response to rise of pressure and the other in response to abnormal increases of engine speed.

2. The combination with an engine-driven compressor having a variable cut-off distributing valve gear, of a fluid pressure operated servo-motor connected to control said valve gear to vary the cut-off of the engine; a follow-up valve mechanism for the servo-motor including a part having a connection with the moving element of the servo-motor; a pressure responsive device subject to pressure created by said compressor; a speed responsive governor; and connections subjecting said valve mechanism to independent selective control by said pressure responsive device and said governor, the parts being so arranged that the governor assumes control only under over-speed conditions.

3. The combination with an engine-driven compressor having a variable cut-off distributing valve gear, of a fluid pressure operated servo-motor connected to control said valve gear to vary the cut-off of the engine; an admission and exhaust valve mechanism for the servo-motor comprising two movable valve elements, one of which serves as a seat for the other; driving connections between one of said valve elements and the moving member of the servo-motor; yielding means urging the other of said valve elements in a direction to cause the servo-motor to lengthen the engine cut-off; and two devices capable of entering independently into thrust relation with said other valve element in opposition to said yielding means, one of said devices moving in response to increase in pressure and the other in response to abnormal increase in engine speed.

RUDOLF WINTZER.